P. C. BURNS.
MOUTHPIECE ATTACHMENT FOR TELEPHONE TRANSMITTERS.
APPLICATION FILED AUG. 12, 1909.
1,109,037.
Patented Sept. 1, 1914.
2 SHEETS—SHEET 1.
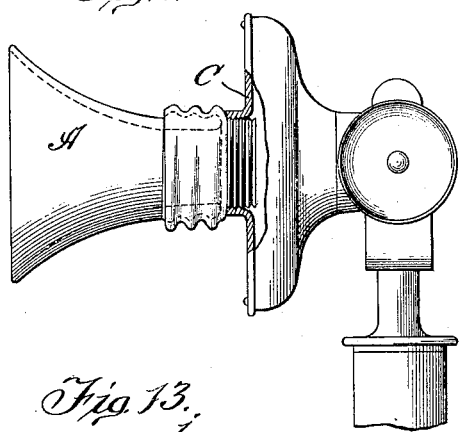
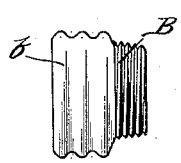
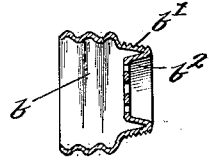
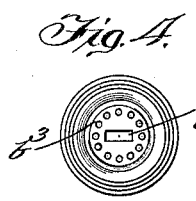
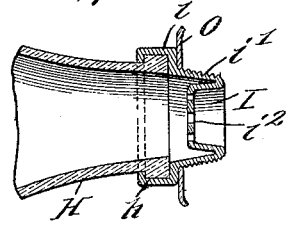
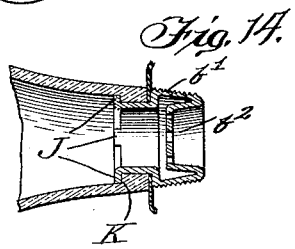
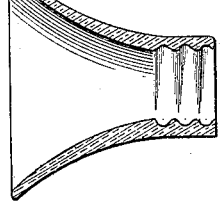
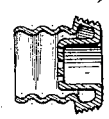
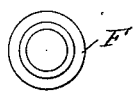
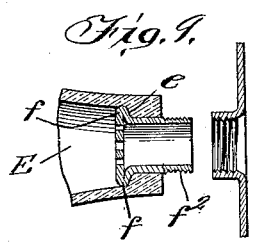
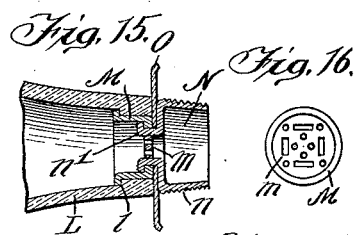
Witnesses:
Inventor:
Peter C. Burns
By Bulkley, Durand & Durng
Attys P. C. BURNS.
MOUTHPIECE ATTACHMENT FOR TELEPHONE TRANSMITTERS.
APPLICATION FILED AUG. 12, 1909.
1,109,037.
Patented Sept. 1, 1914.
2 SHEETS—SHEET 2.
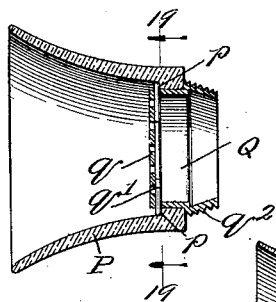
Fig. 18.
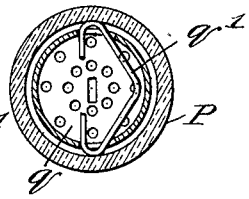
Fig. 19.
Fig. 24.
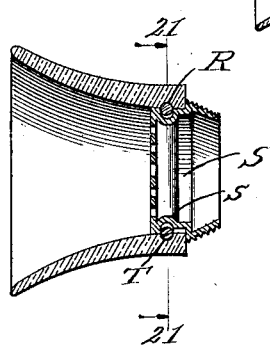
Fig. 20.
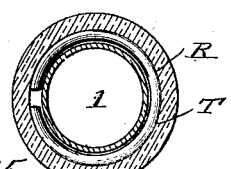
Fig. 21.
Fig. 25.
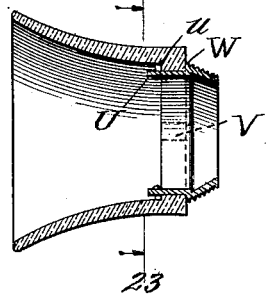
Fig. 22.
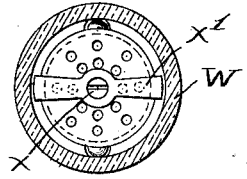
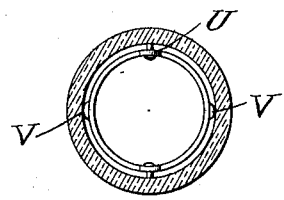
Fig. 23.
Witnesses;
Inventor;
Peter C. Burns
By Bulkley Durand & Dung
Attys

UNITED STATES PATENT OFFICE.

PETER C. BURNS, OF CHICAGO, ILLINOIS, ASSIGNOR TO THE AMERICAN ELECTRIC COMPANY, OF CHICAGO, ILLINOIS, A CORPORATION OF ILLINOIS.

MOUTHPIECE ATTACHMENT FOR TELEPHONE-TRANSMITTERS.

1,109,037.  Specification of Letters Patent.  Patented Sept. 1, 1914.

Application filed August 12, 1909. Serial No. 512,497.

*To all whom it may concern:*

Be it known that I, PETER C. BURNS, a citizen of the United States of America, and resident of Chicago, Cook county, Illinois, have invented a certain new and useful Improvement in Mouthpiece Attachments for Telephone-Transmitters, of which the following is a specification.

My invention relates to attachable mouth pieces for telephone transmitters.

Prior to my invention glass mouth pieces have been proposed, and have been used to some extent, but not with entire satisfaction. A mouth piece made of glass requires a metal fitting for connecting the same with the front plate of the transmitter. So far, these metal fittings for connection with the transmitter have not been entirely satisfactory, as they have been of a character that failed to insure a rigid and reliable connection with the mouth piece of the transmitter. In many cases the glass mouth piece has not been properly fastened in place, and as a result has become displaced and broken. Furthermore, the telephone transmitters now in use are of many different makes and patterns, and a glass mouth piece that will fit one will not always fit another. For example, the openings in the front plates of transmitters are of various sizes, and this has caused some trouble. Some attempt has been made to provide the glass mouth pieces with fittings adapted to adjust themselves automatically to the openings of transmitters, regardless of slight variations in the size of said openings, but these have not been entirely satisfactory.

The object of my invention is, therefore, the provision of an improved attachable mouth piece for telephone transmitters, the same being made preferably of glass or other similar material, whereby it may be easily maintained in a sanitary condition, and provided with a metal fitting having provisions for establishing a solid and perfectly rigid screw-threaded connection with the front plate of the transmitter.

It is also an object of my invention to provide an improved arrangement, involving a threaded and tapered coupling, whereby a mouth piece of glass or other similar material, of the general character specified, may be readily and securely attached to transmitters having openings of different sizes in the front plates thereof.

To the foregoing and other useful ends, my invention consists in matters hereinafter set forth and claimed.

In the accompanying drawings—Figure 1 is a side elevation of a glass mouth piece embodying the principles of my invention, showing the front plate of the transmitter in section. Fig. 2 is an outside view of the metal coupling for the said mouth piece. Fig. 3 is a longitudinal section of the said coupling. Fig. 4 is an end view of the said coupling. Fig. 5 is a sectional view of a different form of mouth piece. Fig. 6 shows a form of coupling adapted for the mouth piece of Fig. 5. Fig. 7 is an end view of the coupling shown in Fig. 6. Fig. 8 is a longitudinal section of the coupling shown in Fig. 6. Fig. 9 shows another form of coupling, the adjacent portions of the mouth piece and front plate being shown in section, and the said coupling also being shown in section. Fig. 10 is an outside view of the coupling shown in Fig. 9. Fig. 11 is an end view of the coupling shown in Fig. 9. Fig. 12 shows a form of coupling like that shown in Fig. 9, except that the threaded portion is tapered instead of being straight. Fig. 13 shows still another form of coupling, the same being attached to the outside of the mouth piece. Fig. 14 shows the same kind of a coupling, secured to the inside of the mouth piece. Fig. 15 is a sectional view showing still another form of coupling. Fig. 16 is an end view of one portion of the coupling shown in Fig. 15. Fig. 17 is an end view of the other portion of said coupling. Figs. 18 and 19 are, respectively, a longitudinal and cross section, showing still another form of my invention. Figs. 20 and 21 are similar views, showing another form of my invention. Figs. 22 and 23 are similar views, showing still another form of my invention. Figs. 24 and 25 are similar views showing another form of my invention.

Referring to Figs. 1, 2, 3, and 4, the construction is as follows: The mouth piece A is preferably made of glass, and is formed with external threads at its smaller end, the said threads being rounded and wide apart. The coupling B is of sheet metal and provided with a larger portion *b* having threads stamped or pressed therein, which threads are adapted to engage the threads on the mouth piece. The smaller end portion $b'$ of said coupling is made slightly tapering, and is provided with screw-threads on the outer surface thereof, which latter threads are much finer and closer together than those of the other portion. At the extreme end of said threaded or tapered end portion the metal is turned back and extends across the interior thereof, so as to form a diaphragm or wall $b^2$, which wall is provided with perforations $b^3$ and a slot $b^4$ for a screw driver. The tapered and externally threaded portion $b'$ is adapted to be inserted into the threaded opening in the front plate C of the transmitter, and by reason of the tapered formation slight variations in the size of said opening will make no difference, so far as an effective connection of the mouth piece with the transmitter is concerned. If the said opening is comparatively small, then the said tapered or screw-threaded portion $b'$ will not enter very far through the said opening. If, however, the said opening be larger, then the said tapered or screw-threaded portion will enter much farther, as it necessarily will have to be screwed in farther in order to secure a firm hold on the front plate of the transmitter.

Referring to Figs. 5, 6, 7 and 8, the construction is substantially the same as that shown in Fig. 1, with the exception that the coupling D is constructed to screw inside of the mouth piece, rather than upon the outside of the same.

In Figs. 9, 10 and 11, the construction is as follows: The mouth piece E is formed internally with the shoulder $e$, and the coupling F is pressed into shape and formed of sheet metal. The formation of said coupling is such that it has a doubled-over portion providing a flange or rim $f$ adapted to seat against the shoulder $e$. The outer end of said coupling has a diaphragm $f'$ provided with apertures and a screw driver opening, like those shown in Fig. 4. The threaded portion $f^2$ of said coupling is straight, rather than tapered, and is adapted to be screwed into the threaded opening of the front plate of the transmitter, as shown more clearly in Fig. 9.

In Fig. 12, the construction is substantially the same as that shown in Fig. 9, except that the coupling G has a tapered threaded portion $g$, instead of a straight threaded portion.

In Fig. 13, the construction is as follows: The mouth piece H is formed externally with a shoulder $h$. The coupling I is made of sheet metal, pressed into the proper shape, and has an attaching portion $i$ that is compressed upon the shoulder $h$, in the manner shown. The said coupling has a tapered threaded portion $i'$, like those already described, and has an apertured diaphragm $i^2$, like that shown in Fig. 4.

In Fig. 14, the construction is similar to that shown in Fig. 13, except that in this case the coupling is secured inside of the mouth piece, rather than upon the outside thereof, the attachment being effected by means of lugs J which are doubled over to engage an internal shoulder K formed on the interior of the mouth piece.

In Figs. 15, 16 and 17, the construction is as follows: The mouth piece L has a shoulder $l$, like that shown in Fig. 14. The coupling is made in two pieces, one piece M being provided with means for engaging the shoulder $l$, and having an apertured diaphragm $m$, as shown more clearly in Fig. 16. The outer portion N of the said coupling has a tapered and externally threaded portion $n$ adapted to be screwed into the front plate of the transmitter. This portion N is also provided with lugs $n'$ which are inserted through apertures in the diaphragm $m$ and then bent over to secure the portion N in place.

In Figs. 14 and 15, it will be noted that the mouth piece has a flange or disk O clamped upon the end thereof by the coupling. In Fig. 13, the said flange or plate O is disposed against the shoulder formed on the coupling, in the manner shown, and is adapted to bear against the outside of the front plate of the transmitter.

In Figs. 18 and 19 the construction is as follows: The mouth piece P is provided internally with a shoulder $p$. The coupling Q is made of sheet metal and provided with an apertured diaphragm $q$ having an opening for a screw driver. The inner end of said coupling has a spring $q'$, and its outer end portion $q^2$ is tapered and threaded externally, like those previously described. When adjusted in place, the outer end portions of the spring $q'$ engage the shoulder $p$ and hold the coupling in place.

In Figs. 20 and 21, the construction is similar to that shown in Figs. 18 and 19, but with certain differences as follows: In this case the mouth piece has an annular groove R around the interior thereof. The coupling S has an exterior groove $s$ extending circumferentially thereof. The ring-like spring T is deposited in place in the groove $s$ and is adapted to spring outwardly to engage the groove R when the coupling is inserted in the mouth piece.

In Figs. 18 and 20, it will be seen that the construction is such that the coupling can be readily released from the mouth piece, and is such that the coupling can be screwed into the front plate of the transmitter. Then the mouth piece can be slipped over the said coupling and the spring on said coupling will hold the mouth piece in place. Thus the coupling can be attached separately, and the mouth piece afterward.

In Figs. 22 and 23, the mouth piece is of the same formation shown in Figs. 18 and 20, and the coupling is substantially the same formation, with certain differences as follows: In this case the inner end of the coupling is provided with lugs U having pins $u$ inserted therethrough and extending outwardly therefrom. The mouth piece is provided internally with grooves V, which grooves are cut through the internal flange forming the shoulder on the interior of the mouth piece. The coupling is adjusted in such manner that the pins $u$ pass through the grooves V. When the shoulder W on the coupling engages the end of the mouth piece, so that the pins $u$ are inside of the shoulder of the said mouth piece, then the coupling is revolved to bring the said pins out of line with the said grooves. Thus a slight turn of the coupling is sufficient to enable the mouth-piece to be removed from the coupling. It will be seen that the shoulder $w$ is also present in the structure shown in Figs. 12 and 20. The same kind of a shoulder is shown in Fig. 8, and also in Fig. 15.

In Figs. 24 and 25, the mouth-piece W is exactly like the one shown in Figs. 22 and 23. The coupling X is like the one shown in Figs. 18 and 19. Different means, however, are shown for holding the mouth-piece in place. In this case the coupling has a center screw $x$ that holds a clamping bar $x'$ in place to engage the shoulder $w$ on the mouth-piece. The coupling X has lugs $x^2$ that engage in notches $w'$ in the mouth-piece, whereby the latter can be used for screwing the coupling into the transmitter.

In all cases, therefore, I provide a glass mouth-piece, and a metal fitting or coupling therefor, which coupling has an externally threaded portion adapted to be screwed into the front plate of a transmitter. Preferably, this threaded portion of the coupling is tapered, so that it will engage and effectively secure the mouth-piece in openings of different sizes. Any and all of the said couplings may have slots for the screw drivers, such as the slot $b^4$ shown in Fig. 4. Thus the coupling need not be rigidly secured to the mouth-piece—that is to say, it can be so attached that the mouth-piece and coupling are adapted to turn or rotate relatively to each other. In this way the glass mouth-piece can be securely fastened to the transmitter, and the said mouth-piece can then rotate freely without danger of loosening the coupling. In other words, the user of the telephone cannot rotate the mouth-piece and thereby disconnect it from the transmitter. The threaded connection, whether straight or tapered, serves effectually to prevent the rotation of the coupling, except by a screw driver or other instrument. So far as the broad idea of the threaded coupling is concerned, however, the connection between the coupling and mouth-piece may be perfectly rigid, so that neither one can turn relatively to the other. In other words, I consider it preferable to leave the mouth-piece free to rotate, so that it cannot be used for rotating the coupling, but without this feature the screw threaded portion can be so tightly screwed into the front plate of the transmitter that the danger of the mouth-piece becoming dislodged and broken is reduced to a minimum.

My improved mouth-piece, of any of the different forms shown, can be manufactured as a part of the transmitter. Or, if desired, and as is often necessary, it may be used as an attachment for transmitters already made and in use. In other words, a glass mouth-piece is a thing that may be sold to the users of telephones, and in such case is essentially in the nature of an attachment. With the forms of couplings shown in Figs. 3 and 8, as well as those shown in Figs. 18, 20 and 22, the glass mouth-piece can be removed from the transmitter without removing the coupling. In this way the said mouth-piece can be readily taken off and cleaned without the necessity of removing the coupling from the transmitter.

What I claim as my invention is:

As an article of manufacture, a metal fitting provided with a screw-threaded portion for attachment to the front of a transmitter, said fitting having a diaphragm or transverse wall provided with a slot for a screw driver, and a glass mouth piece attached to said fitting.

Signed by me at Chicago, Illinois, this 28th day of July 1909.

PETER C. BURNS.

Witnesses:
WILLIAM ARIS,
ELLEN H. CLEGG.